W. F. PATTERSON.
Improvement in Toilet-Mirrors.
No. 128,651.    *Fig. 1*    Patented July 2, 1872.
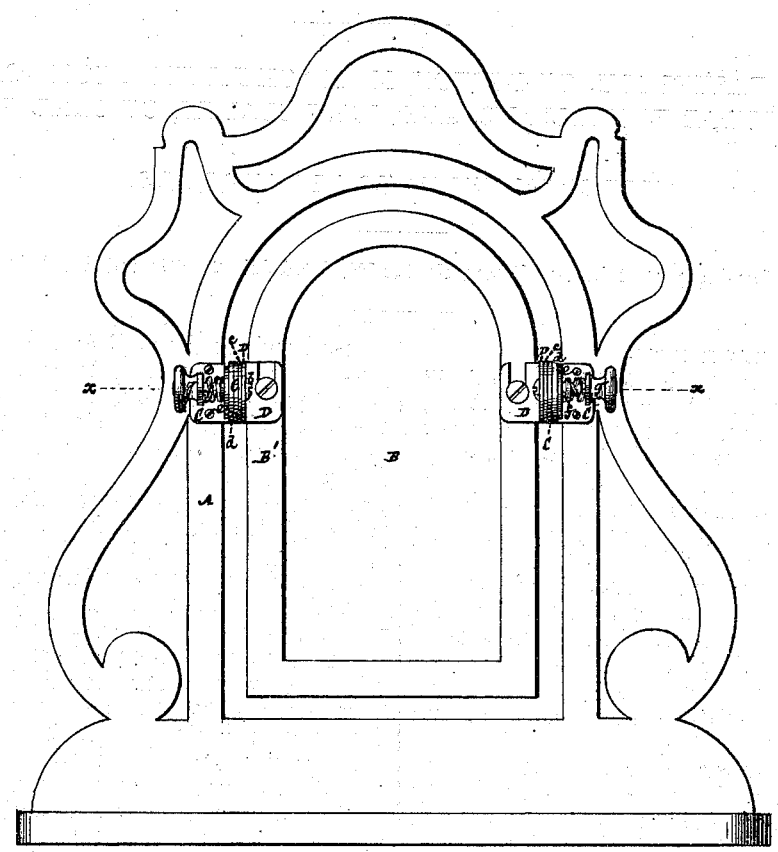
*Fig. 2*
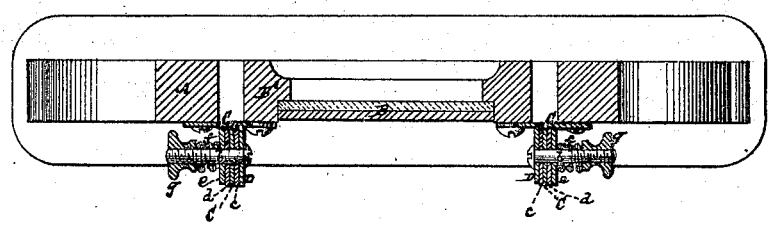
Witnesses.

128,651

UNITED STATES PATENT OFFICE.

WILLIAM F. PATTERSON, OF BOSTON, MASSACHUSETTS, ASSIGNOR TO HIMSELF, GEORGE W. WILLIAMS, AND JOHN CLARKE, OF SAME PLACE.

IMPROVEMENT IN TOILET-MIRRORS.

Specification forming part of Letters Patent No. 128,651, dated July 2, 1872; antedated June 18, 1872.

*To all whom it may concern:*

Be it known that I, WILLIAM F. PATTERSON, of Boston, in the county of Suffolk and State of Massachusetts, have invented a new and useful Improvement in Toilet and other Mirrors, of which the following is a full, clear, and exact description, reference being had to the accompanying drawing forming part of this specification, and in which—

Figure 1 represents a back view of a mirror constructed in accordance with my improvement, and Fig. 2 a horizontal section thereof at the line $x$ $x$ in Fig. 1.

Similar letters of reference indicate corresponding parts throughout the several figures of the drawing.

My invention has reference to mirrors which are suspended by side pivots in a surrounding or inclosing stationary frame. The invention consists in a novel pivoted attachment, by means of a clamp composed in part of brackets, of the mirror proper to its frame, whereby better provision is made for adjusting and holding the mirror by a novel construction of such combined clamp and pivot.

Referring to the accompanying drawing, A represents the stationary frame, and B B' the mirror proper, B' being the casing which carries the glass. C C are brackets, fastened by screws or otherwise to the sides of the frame A at its back, and D D similar brackets, fastened to the sides of the casing B' at its back. These brackets C and D form cheeks for support of the pivots $b$ $b$, in eccentric relation with the sides of the mirror by the arrangement of said pivots in rear of the latter. The cheeks of the brackets D D turn on or with the pivots $b$ $b$, subject to frictional hold or pressure as produced by washers $c$ $c$ and $d$ $d$, of rubber, pasteboard, or other suitable material, interposed between the cheeks of the brackets C C and D D, and between the brackets C C and loose followers $e$ $e$, arranged upon the pivots $b$ $b$, said followers being acted upon by springs $f$ $f$, interposed between them and nuts $g$ $g$, which fit screw-extensions of the pivots. The brackets carrying the pivots are thus made to form elastic friction devices or clamps to hold the mirror at any angle to which it may be adjusted. By turning the nuts $g$ $g$, the frictional hold or pressure of said clamp may be adjusted.

What is here claimed, and desired to be secured by Letters Patent, is—

The combination of the brackets C C D D, the pivots $b$ $b$, the friction-strips or washers $c$ $c$ $d$ $d$, the springs $f$ $f$, and the nuts $g$ $g$, the whole being arranged in relation with the mirror and its outer or stationary frame, essentially as described.

WILLIAM F. PATTERSON.

Witnesses:
J. W. LITTLEFIELD,
G. W. LITTLEFIELD.